June 26, 1951     H. H. DURHEIM ET AL     2,557,954
AUTOMATIC TRAIN SPEED CONTROL SYSTEM Filed July 23, 1947     3 Sheets-Sheet 1

INVENTORS
STANISLAS VAN MIERLO
HANS H. DURHEIM
BY
*Robert Hardin*
ATTORNEY

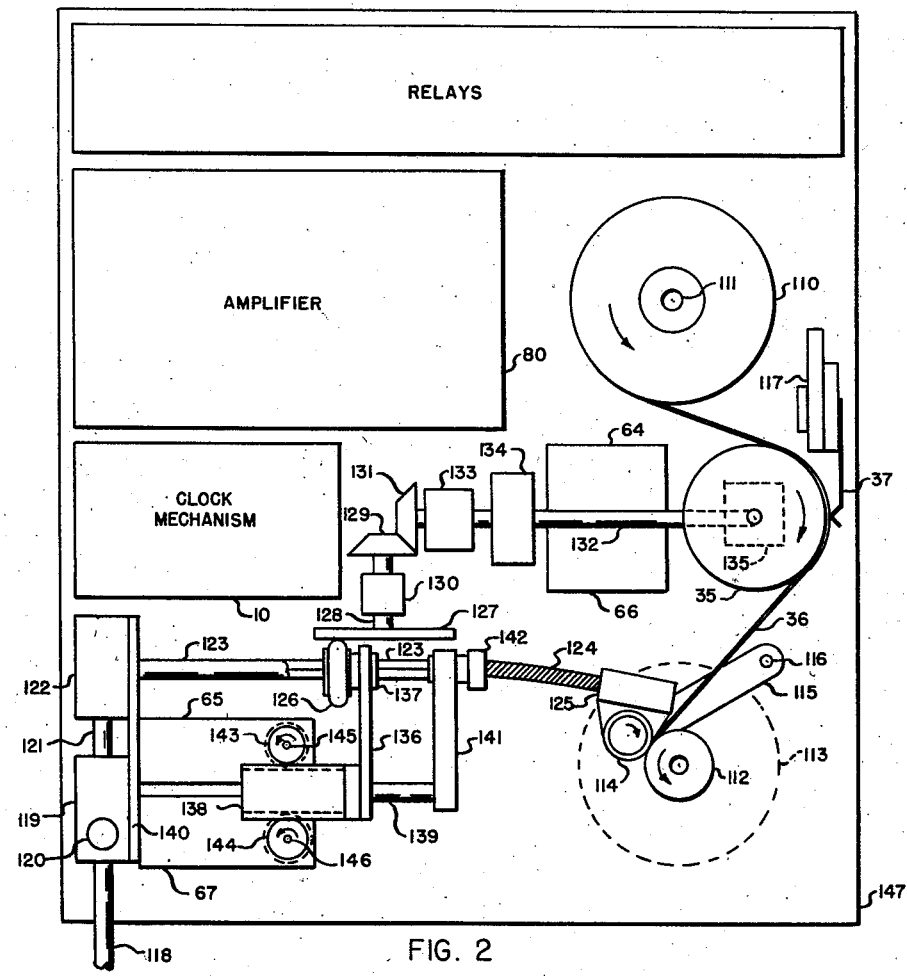

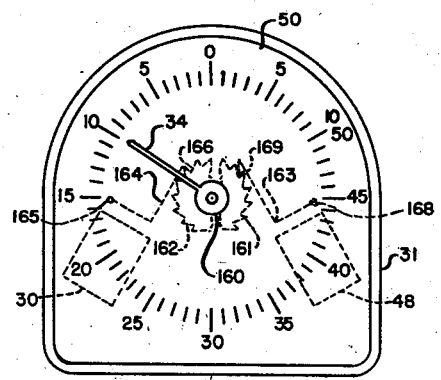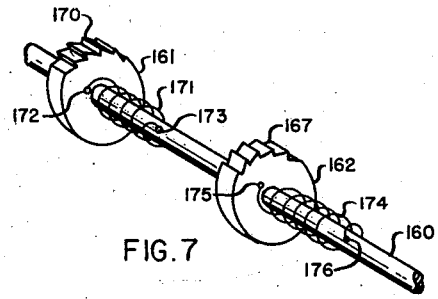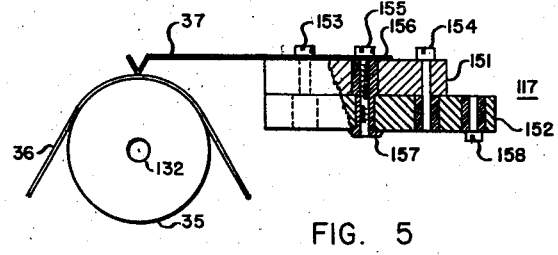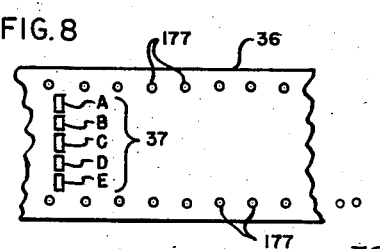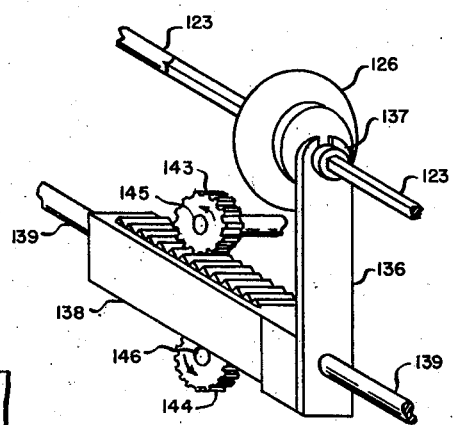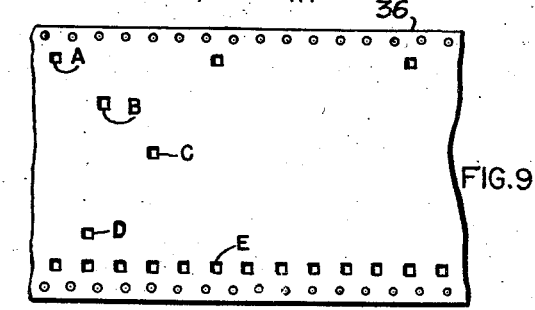

Patented June 26, 1951

2,557,954

UNITED STATES PATENT OFFICE 2,557,954

AUTOMATIC TRAIN SPEED CONTROL SYSTEM

Hans Hugo Durheim, Berne, Switzerland, and Stanislas Van Mierlo, Paris, France, assignors to International Standard Electric Corporation, New York, N. Y., a corporation of Delaware Application July 23, 1947, Serial No. 763,116
In Switzerland January 13, 1945

Section 1, Public Law 690, August 8, 1946
Patent expires January 13, 1965

7 Claims. (Cl. 235—103.5)

This invention relates to indicating apparatus and more particularly to apparatus for automatically indicating the deviation from a given schedule of a train performing any particular journey.

During the operation of a locomotive it is desirable that the engineer have some time during which he need not of necessity devote himself to his routine tasks. It is especially important that this be the case during a rain, fog, period of darkness, or the occurrence of any other event which tends to increase the inherent danger of the journey. If the engineer has some freedom from routine at such a time he can devote himself to the observation of movable track signals and other important matters affecting the efficiency and safety of the journey and thereby perform his duties with increased efficiency and with an increased factor of safety.

Accordingly, it is a principal object of this invention to provide apparatus for automatically indicating the actual deviation from schedule of a locomotive performing any particular journey.

It is another object of this invention to provide apparatus which may be employed to automatically regulate the speed of the locomotive to correspond to a predetermined schedule.

It is a further object of this invention to provide means for indicating the passage of any particular predetermined place along the journey such as, for example, a landmark, a certain signal, a curve, and the like.

A feature of this invention relates to the indicator which compares an electrical pulse having a repetition frequency proportional to the schedule time of the journey with an electrical pulse having a repetition frequency proportional to the actual speed of the locomotive.

Another feature of this invention relates to the obtaining of electrical pulses having a repetition frequency proportional to the schedule time of the journey wherein a source of electrical pulses of constant repetition frequency is employed.

Another feature of this invention relates to the obtaining of electrical pulses having a repetition frequency proportional to the speed of the locomotive wherein the travel of a device driven by the locomotive at a speed proportional to the actual locomotive speed causes the production of those pulses.

Another feature of this invention relates to the device causing the production of pulses having a repetition frequency proportional to the speed of the locomotive wherein the travel of the locomotive at a speed equal to the scheduled speed causes the production of pulses having a repetition frequency equal to that of the pulses of constant repetition frequency.

A further feature of this invention relates to the indication of passage of predetermined places along the journey in that a piece of iron is secured at those places and reacts with an electrical circuit to cause the generation of an electrical pulse.

A further feature of this invention relates to the generation of the electrical pulses having a repetition frequency proportional to the speed of the locomotive in that a tape having perforations therein is employed to complete an electrical circuit each time a perforation is in coincidence with an electrical contact.

A further feature of this invention relates to the apparatus wherein the stopping time in excess of the scheduled stopping time is automatically indicated by the indicator.

A still further feature of this invention relates to the correction of the position of the tape relative to the travel of the train wherein that correction is automatically accomplished by the cooperation of electrical and mechanical means operated upon a predetermined lead or lag in the travel of that tape.

A still further feature of this invention relates to the automatically variable drive between the tape drive and the locomotive drive for driving the tape in that the ratio between the speed of the tape and the speed of the locomotive is variable.

A still further feature of this invention relates to the novel organization, arrangement and interconnection of parts which cooperate to produce an improved device for indicating the actual time of travel as distinguished from the scheduled time of travel.

Other objects, features and advantages not particularly enumerated are apparent to those skilled in the art as will be evident from the following descriptions taken in connection with the accompanying drawings.

In the drawings:

Fig. 2 is an elevational view showing an embodiment of the mechanical arrangement of the invention.

Fig. 3 is a top view of the embodiment shown in Fig 2.

Fig. 4 is a plan view of part of the tape control mechanism shown in Figs. 2 and 3.

Fig. 5 is a view, partly in cross-section, showing an arrangement of the finger contacts.

Fig. 6 is a schematic showing of one type of indicator which may be employed by the invention.

Fig. 7 is an isometric view of a portion of the indicator shown in Fig. 6, and

Fig. 8 is a view of a paper tape utilized by the invention.

Fig. 9 is another view of the tape shown in Fig. 8.

Similar numerals refer to similar parts throughout the several views.

Figure 1:
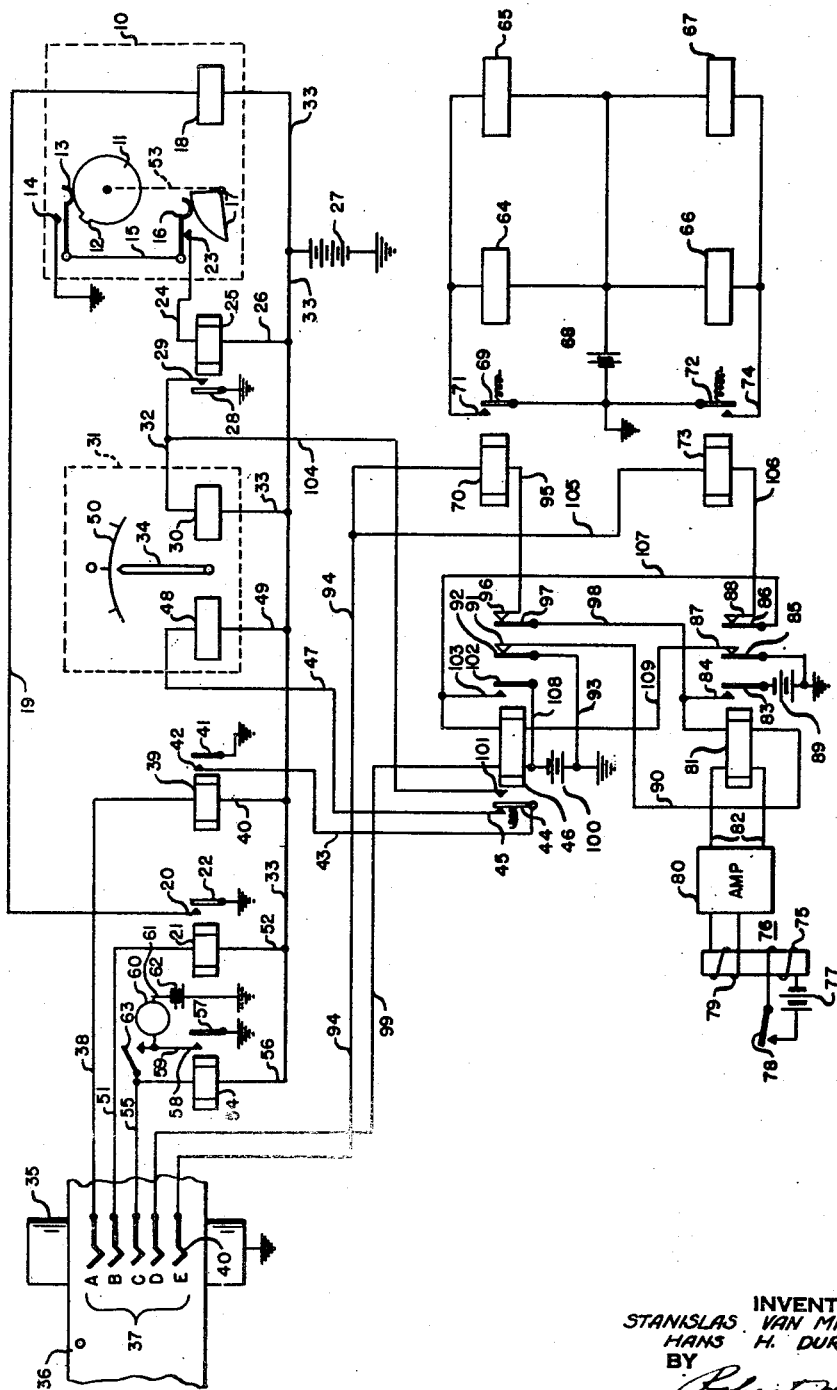
Fig. 1 is a circuit diagram, partly in block and and schematic form, embodying the principles of the invention.

First, description will be made of the circuit diagram embodying the principles of the invention and then the various parts cooperating therewith will be described.

Referring more particularly to Fig. 1, the clock mechanism 10 serves to produce electrical pulses of constant repetition frequency. These pulses are produced when rotatable disc 11 having lug 12 on its periphery rotates to bring lug 12 into contact with arm 13 thereby forcing that arm to engage grounded contact 14. Arm 13 is connected by conductor 15 to arm 16 which rides the periphery of cam 17 actuated by relay 18 connected by conductor 19 to contact 20 of relay 21, which operates relay armature 22. The position of cam 17 determines when arm 16 will be in contact with the contact 23 and when it will be lifted therefrom.

When arm 13 contacts the contact 14 and cam 17 is in its normal position, as shown, a circuit is completed from ground through contact 14, arm 13, conductor 15, arm 16, contact 23, conductor 24, relay 25, conductor 26, battery 27 and back to ground. Relay 25 is thus energized and armature 28 engages contact 29. This causes energization of relay 30 associated with indicator 31 by the electrical circuit completed from ground to armature 28, contact 29, conductor 32, relay 30, conductor 33, battery 27 and back to ground. This circuit remains closed as long as relay 25 is energized and that relay is energized during the time arm 13 and contact 14 are in conductive contact which means that the engagement of lug 12 with arm 13 for a predetermined time results in the production of a pulse of predetermined duration by the last-described circuit. The pulse thus produced enables relay 30 to exert a force tending to cause a corresponding deviation of needle 34 of indicator 31.

Ground member 35 represents a disc, cylinder or other metallic member over which tape 36 passes at a speed proportional to the speed of the locomotive. Contact fingers 37A—E are mounted in spaced relation to member 35 and are held out of contact therewith by tape 36. Tape 36 contains a series of perforations corresponding to each of the contact fingers 37A—E and each of those fingers accordingly contact member 35 as the perforations corresponding to it pass intermediate that finger and member 35.

The perforations corresponding to contact finger 37A are equally spaced from each other along the tape 36 so that the locomotive when running at exactly scheduled speed will drive tape 36 at a speed to cause a perforation to be between finger contact 37A and member 35 each time a pulse is produced by clock mechanism 10. For this reason, this series of perforations will be called the indicator perforations hereinafter.

Each time one of these indicator perforations is intermediate contact finger 37A and member 35 an electrical circuit is completed from ground through member 35, contact finger 37A, conductor 38, relay 39, conductor 40, conductor 33, battery 27 and back to ground. Relay 39 is energized causing armature 41 to engage contact 42. This engagement completes an electrical circuit from ground through armature 41, contact 42, conductor 43, armature 44 and contact 45 of relay 46, conductor 47, relay 48, conductor 49, conductor 33, battery 27, and back to ground. Relay 48 is arranged to react upon needle 34 of indicator 31 in a direction opposite to the reaction from relay 30. The force exerted upon needle 34 by relay 48 will be the same as that exerted by relay 30 if relay 39 is energized and deenergized simultaneously with relay 25. This situation is present when the train is traveling at the scheduled speed and the resultant deflection indicated by the time calibrated scale 50 is zero. The construction and operation of a suitable type indicator will be fully described hereinafter as well as the remaining components associated with this invention.

The series of perforations corresponding to contact finger 37B are utilized to allow for the scheduled stopping time of the locomotive at any predetermined place along a particular journey. To accomplish this the periodic operation of relay 30 is stopped for the scheduled stopping time and is again periodically operated to indicate the excess stopping time, if any. Upon approaching a stop the stopping time perforations allow an electrical circuit to be completed from ground through member 35, contact finger 37B, conductor 51, relay 21, conductor 52, conductor 33, battery 27 and back to ground. The completion of this electrical circuit causes armature 22 of relay 21 to engage contact 20 and thereby complete an electrical circuit from ground through armature 22, contact 20, conductor 19, relay 18, conductor 33, battery 27 and back to ground. This energizing of relay 18 causes the clockwise rotation of cam 17 resulting in arm 16 being disengaged from contact 23, thereby deenergizing relay 25 releasing armature 28 from contact 29 which results in the de-energizing of relay 30. Thus, the pulses of constant repetition frequency resulting from the operation of clock mechanism 10 do not affect indicator 31 during the normal stopping time.

Relay 18 may be operated in response to a single or plurality of contacts by contact finger 37B with member 35; the important thing is that contact is broken between the finger 37B and member 35 when the train stops and relay 18 de-energized. As stated above, the energization of relay 18 rotates cam 17 clockwise to break connection between arm 16 and contact 23 and the deenergization of that relay leaves cam 17 in the same position. Any of the known means to rotate a cam upon actuation of a relay may be utilized to rotate cam 17 upon energization of relay 18. Connection is again made between arm 16 and contact 23 when cam 17 returns to its normal position which return is accomplished by the clock mechanism 10. A coupling 53 of suitable character between disc 11 and cam 17 immediately begins the returning of that cam to its normal position when the locomotive stops. One way in which the rotation of the cam 17 may be accomplished is by means of a linkage (not shown) with the armature (not shown) of relay 18. The coupling 53 may comprise a clutching mechanism to couple cam 17 to disc 11 when the cam fully rotates and which disengages cam 17 upon a completion of the counter-rotation. Upon the deenergization of relay 18 attendant on the stopping of the train, the clutching mechanism engages the cam 17 and the turn ratio effected by coupling 53 is such that the cam reaches its normal position when the normal stopping time has elapsed. At this time the constant repetition frequency pulses are again caused to react on indicator 31, as previously described, effecting an indication of the excess stopping time, if any.

The tape perforations corresponding with contact finger 37C are called the warning perforations because they serve to warn the engineer of predetermined pecularities or places along the journey such as, for example, a track signal. The number of such perforations bears no relation to any other perforations or to the repetition frequency of any other pulses produced by this invention but vary in accordance with the track conditions and individual desire.

When a warning perforation allows finger contact 37C to contact member 35, relay 54 is energized by the circuit from ground through member 35, finger contact 37C, conductor 55, relay 54, conductor 56, conductor 33, battery 27 and back to ground. The energization of relay 54 causes its armature 57 to make connection with contact 58 which action completes an electrical circuit from ground through those elements, conductor 59, lamp 60, conductor 61, battery 62 and back to ground. This causes the lamp 60 to light which affords a visual indication that a certain predetermined place has been reached. Instead of using relay 54 to complete the circuit which lights the lamp, a switch arm 63 may be employed. If arm 63 is closed a direct circuit is completed through the lamp when a perforation enables finger contact 37C to contact member 35. While only one lamp is shown, it is understood that a series of lamps may be used and if desirable a particular lamp used to indicate each predetermined place along the journey.

Finger contacts 37D and 37E and the remaining circuit arrangement are provided to correctly position the tape 36. Because of the particular function of the circuits associated with finger contacts 37D and 37E the perforations corresponding to these contacts are called the tape position perforations and the tape position correction perforations, respectively.

The position perforations and the position correction perforations are each arranged at predetermined intervals which will be fully described by way of example.

The physical positioning of the tape is accomplished by the stepping mechanisms 64, 65, and 66, 67, which are here shown as relays. These relays are energized by battery 68 and are used to institute the motion required to advance the tape in either a forward or backward direction. It is readily seen that when armature 69 of relay 70 engages contact 71, the relays 64 and 65 are energized and when armature 72 of relay 73 engages contact 74, the relays 66 and 67 are energized. As described herein, relays 64 and 65 effect forward advance of the tape while relays 66 and 67 cause the tape to be turned backwards or opposite to the direction of its drive by the locomotive.

Primary winding 75 of magnet 76 is energized by battery 77 when switch 78 is closed. Secondary winding 79 is connected to amplifier 80. Magnet 76 is secured onto the locomotive so that it clears the pieces of iron, by a certain predetermined amount, such as, for example, one centimeter, two centimeters, or the like. The pieces of iron are affixed to the railroad ties at predetermined intervals along the journey. When the magnet passes over the pieces of iron, a current is induced in it which is amplified by amplifier 80 and employed as described hereinafter. The distance between the pieces of iron is such that the pulses resulting from their cooperation with magnet 76 have the same repetition frequency as the pulses resulting from the cooperation of the tape position perforations with finger contact 37D when the locomotive is running at schedule speed. This requirements is fulfilled in this embodiment when the pieces of iron are placed at intervals of ten kilometers along the track.

If the current is induced in magnet 76 before finger contact 37D contacts member 35, the relay 81 connected to amplifier 80 by conductors 82 is energized and armature 83 is brought into engagement with contact 84 while armatures 85 and 86 are pulled away from contacts 87 and 88 respectively. The engagement of armature 83 with contact 84 completes an electrical circuit from ground through battery 89, armature 83, contact 84, conductor 90, contact 91 and armature 92 of relay 46, conductor 93 and back to ground. Since this is the only circuit completed by the operation of relay 81, it is obvious that that relay has effectively blocked itself. Relay 70 is energized periodically by the movement of tape 36 and circuit is completed from ground through member 35, finger contact 37E, conductor 94, relay 70, conductor 95, contact 96 and armature 97 of relay 46, conductor 98, contact 84, and armature 83 of relay 81, battery 89 and back to ground. The energization of relay 70 causes its armature 69 to engage the contact 71 and thereby allows battery 68 to operate relays 65 and 64 which control a suitable turning mechanism which advances the tape in a forward direction.

When the tape position perforations allow finger contact 37D to contact member 35 an electrical circuit is completed from ground through member 35, finger contact 37D, conductor 99, relay 46, battery 100 and back to ground. The completion of this circuit results in the operation of relay 46 which causes armature 44 to disengage contact 45 and engage contact 101, armature 102 to engage contact 103 and armatures 92 and 97 to disengage contacts 91 and 96, respectively. From the above description, it is clear that the disengagement of armature 97 and contact 96 results in breaking the circuit through relay 70 and thereby causes the forward advance of tape 36 resulting from the operation of that relay to cease and that the disengagement of armature 92 from contact 91 opens the circuit blocking relay 81.

If now the tape position correction perforations allow finger contact 37E to contact member 35 before a current is induced in magnet 76 this shows that tape 36 is too far advanced, in other words, to be correctly positioned it must be moved opposite to its normal movement or slowed down in that movement. When finger 37D contacts member 35, a circuit is completed from ground through member 35, finger contact 37D, conductor 99, relay 46, battery 100 and back to ground, and armatures 44 and 102 are operated. The above operation completes an electrical circuit from ground through member 35, finger contact 37E, conductor 94, conductor 105, relay 73, conductor 106, contact 88 and armature 86 of relay 81, conductor 107, contact 103 and armature 102 of relay 46, conductor 108, battery 100 and back to ground. Armature 72 of relay 73 is moved into engagement with contact 74 and circuit is completed to allow battery 68 to energize relays 66 and 67 which effect the movement of tape 36 in a backward direction. This backward movement is stopped by operation of relay 81 which disengages armature 86 from contact 88 which opens the above circuit de-energizing relay 73 and allowing armature 72 to disengage contact 74 thereby opening the circuit through battery 68.

The engagement of armature 44 with contact 101 results in the routing of pulses caused by the indicator perforations to the relay 30 associated with indicator 31 instead of to relay 48 associated with that indicator. These resulting pulses fed to relay 30 compensate for the additional pulses fed to relay 48 during the advance of tape 36 in the manner described above. Circuit is completed from ground through armature 41 and contact 42 of relay 39, conductor 43, armature 44 and contact 101 of relay 46, conductor 104, conductor 32, relay 30, conductor 33, battery 27 and back to ground.

Means are provided to block relay 46, when, as described above, it operates before relay 81. If relay 46 does operate first a blocking circuit is completed from ground through battery 100, conductor 108, armature 102, contact 103, conductor 107, relay 46, conductor 109, contact 87 and armature 85 of relay 81 and to ground.

All of the requirements for electrical energy may be obtained from the equipment normally carried in the locomotive.

Figs. 2 and 3 show a mechanical embodiment of this invention in elevational view and top view, respectively. Roll 110 comprises the paper tape 36 and is secured to shaft 111 by any suitable means such as a threaded nut. Shaft 111 is mounted on a ball bearing to permit easy rotation of roll 110 secured thereto. Tape 36 is driven by cylindrical member 35 and is wound upon the core 112 of reel 113. Roller 114 is driven by a non-driving wheel of the locomotive and turns at sufficient speed to exert a slight pull on tape 36 thereby excluding the possibility of its sagging or kinking. Roller 114 is carried by arm 115 which is pivotally mounted at 116 by any suitable means such as, for example, a shaft, a bolt, or the like. Roller 114 exerts a substantially constant pressure on tape 36 until that tape is completely wound upon core 112. This is made possible because of the pivotal mounting of core 112. Finger contacts 37 fastened to mounting 117 are urged against tape 36 as shown and contact the periphery of member 35 in accordance with the perforations in tape 36 corresponding to each finger contact.

The entire arrangement for driving or feeding tape 36 is driven by a flexible shaft 118 connected to a non-driving wheel or shaft of the locomotive. The connection of shaft 118 may be made to a non-driving wheel by connecting it to a roller which rides the periphery of that wheel or by connecting it to the shaft of a non-drive wheel by means of gears or by any other suitable means which will rotate shaft 118 at a speed proportional to the speed of the locomotive. Shaft 118 is connected at its other end to the drive and disconnect clutch 119 which is provided with a button 120 to effect the driving or non-driving condition. The use of button 120 facilitates the use of this invention since it is of service only during a scheduled journey. The driving side of clutch 119 is connected to shaft 121 which connects to the worm-screw tangential gear 122 drivingly connected to shaft 123. Flexible shaft 124 is connected to roller 114 and effects the rotation of that roller through any suitable gearing arrangement contained in housing 125.

A portion of shaft 123 is formed as a rectangle and wheel 126 is rotatably and slidably mounted thereon. Wheel 126 frictionally engages the face of disc 127 fixedly mounted on shaft 128. Shaft 128 drives bevel gear 129 through box 130 containing a suitable ratio gear driving arrangement. Bevel gear 131 meshes with bevel gear 129 and drives the shaft 132. Bushing 133 and clutch 134 are connected to shaft 132 intermediate gear 131 and gear 135 driving the cylindrical member 35. Relays 64 and 66, along with associated equipment necessary to effect the turning of shaft 132 as described in connection with Fig. 1 are mounted intermediate clutch 134 and gear 135. Clutch 134 is provided to allow the relays 64 and 66 to effect a temporary change in the speed of the tape 36 relative to its normal speed of travel transmitted by shaft 119 which is rotated at a speed proportional to the speed of the locomotive.

It is frequently necessary to change the rotational speed of the cylindrical member 35 driving tape 36. Among the things necessitating such a change in the diameter of the locomotive wheels because of wear and an expansion or contraction of the tape 36. It is because of this that the disc 127 and wheel 126 are arranged to effect automatically a variable turn ratio between the locomotive wheel and the cylindrical member 35 driving tape 36. Plate 136 is provided to effect the lateral movement of wheel 126 along shaft 123 and thereby change the driving ratio of disc 127 by changing the effective driving radius of that disc. Plate 136 fits into a cylindrical groove provided in collar 137 of wheel 126. At the other end plate 136 is attached by any suitable means such as screws to a block 138 mounted on non-rotatable shaft 139 and slideable therealong. Shaft 139 is held in a fixed position by plates 140 and 141 secured to its ends. Plate 141 is also affixed to adaptor 142 connecting shafts 123 and 124. Block 138 contains a series of teeth on its top and a similar series of teeth on its bottom. These teeth are meshed with gears 143 and 144 respectively fixedly mounted on shafts 145 and 146. Shafts 145 and 146 are actuated by relays 65 and 67 through suitable shaft actuating mechanisms intermediate the shafts and cooperating relay. The operation of relay 65, in accordance with the description in connection with Fig. 1, actuates the necessary mechanisms to effect counterclockwise rotation of gear 143 which drives block 138, plate 136 and wheel 126 to the right. Hence, wheel 126 is displaced toward the center of disc 127 decreasing the effective driving radius of that disc causing cylindrical member 35 to drive tape 36 at an increased speed. When relay 67 is actuated it causes, by similar processes, the counter-clockwise rotation of gear 146 which likewise causes the displacement of wheel 126 to the left increasing the effective driving radius of disc 127 and causing a corresponding decrease in the speed of the movement of tape 36. In this embodiment the displacement of 126 is made in units of two-tenths of a millimeter and the effective driving radius of disc 127 is varied from five and one-tenth centimeters to four and four-tenths centimeters.

The entire arrangement is included in a single cabinet or box and secured therein by any conventional mounting means. This cabinet as shown includes the side plates 147 and 148, end plates 149 and 150 and top and bottom plates which are not shown.

Fig. 4 shows an isometric view of the mechanism for effecting a change in the speed of the tape relative to the speed of the locomotive. This figure affords a better understanding of the mechanism than the showing in Figs. 2 and 3. Here, it is clearly seen that the rotation of shaft 123 causes wheel 126 to rotate with it and that the movement of plate 136 along shaft 123 displaces wheel 126 accordingly without interfering with the rotation of that wheel and shaft. The movement of plate 136 is effected by the rotation of either one of the gears 143 and 144 which causes a corresponding displacement of block 138 along the fixedly mounted shaft 139.

Fig. 5 shows with particularity one method of mounting the finger contacts and the relation of those contacts to the tape 36 driven by cylindrical member 35. Mounting 117 is secured to the cabinet by means of screws or bolts and includes the insulating plates 151 and 152. These plates are fastened together by screws 153 and 154. Finger contact 37 is secured to plate 151 by screw 155 which is threaded into sleeve 156 molded in plate 151. Screw 155 also makes contact with sleeve 157 molded in plate 152. Any suitable electrical connection is provided between sleeve 157 and output terminal 158. While Fig. 5 shows the detail of the mounting of only one finger contact it is understood that each contact is mounted in a similar way on the plates 151 and 152 and that each is provided with its own output terminal corresponding to terminal 158.

Finger contacts 37 are so chosen as to give the desired elasticity or exert the desired pressure against member 35 and to suffer from a minimum of wear while providing good electrical contact with that member. Finger contacts made of Phosphor bronze in the form of a wire 0.6 mm. in diameter have been found to yield good results.

Figs. 6 and 7 show in schematic form the structure of indicator 31. Scale 50 is calibrated into fifty divisions to indicate the lag from the scheduled time. The lag time or minutes behind schedule are read from zero in a counterclockwise direction. The lead time or minutes ahead of schedule are indicated by ten divisions reading in a clockwise direction from zero. It will be understood from the following description of the indicator that scale 50 may be calibrated to indicate desired units of time by effecting a multiplication or demultiplication in the deflection of pointer 34.

Pointer 34 is fixedly pinned to shaft 160. Ratchet wheels 161 and 162 are rotatably mounted on shaft 160 and are associated with the relay operated pawls 163 and 164 respectively. Pawl 164 is pivotally mounted at 165 and its portion 166 is formed to engage one of the teeth 167 of ratchet wheel 162 when relay 30 actuates that pawl. Pawl 163 is pivotally mounted at 168 and its portion 169 is formed to engage one of the teeth 170 of ratchet wheel 161 when that pawl is actuated by relay 48.

Spring 171 is fastened at one end to ratchet wheel 170 at 172 and its other end is fastened to shaft 160 at 173. Spring 174 is fastened at one end to ratchet wheel 162 at 175 and its other end is fastened to shaft 160 at 176. The engagement of portion 166 of pawl 164 with one of the teeth 167 of ratchet wheel 162 tends to rotate that ratchet wheel counterclockwise against the pressure of spring 174 which tends to rotate shaft 160 and pointer 34 in the same direction. The engagement of portion 169 of pawl 163 with one of the teeth 170 of ratchet wheel 161 tends to rotate that ratchet wheel clockwise against the pressure of spring 171 which tends to rotate shaft 160 and pointer 34 in the same direction. Since this action causes springs 171 and 174 to tend to rotate pointer 34 in opposite directions that pointer is actually rotated in the direction of the resultant force a distant dependent upon the magnitude of that force. It follows, therefore, that the indicator 31 furnishes at all times an indication of the relation between the total number of constant repetition frequency pulses received by relay 30 and the total number of pulses received by relay 48 as a result of the movement of tape 36. In other words, indicator 31 indicates at all times the lag or lead of the actual running time in minutes relative to the predetermined fixed schedule time.

Shaft 160 may be provided with circuit operating contacts to accomplish visual indication as to whether the locomotive is behind or ahead of the schedule. These contacts may take the form of lugs on the periphery of the shaft which effect the closing of a circuit containing an electric lamp when the actual running time is lagging the schedule time and which effect the closing of another circuit containing another electric lamp when the actual running time is leading the scheduled time. In addition to affording an indication of the relative running time from a distance the same lug contact or lug contacts may be employed to control the actual speed of the locomotive. This may be accomplished providing a series of contacts in the path of the lug contact whereby the speed will be controlled in accordance with the magnitude of the lead or lag of the running time.

If an error in indication results from the interaction of ratchet wheels 161 and 162 opposing each other as to the rotation of shaft 160 the arrangement may be altered. The scale 50 may be rotated by one of the ratchet wheels and the pointer 34 rotated in the same direction by the other ratchet wheel. Since rotation of the scale and pointer is in the same direction the indicated reading will be the difference in the rotation of the two and an indication of the actual running time relative to the scheduled time.

Fig. 8 is a top view of a portion of tape 36 with a diagrammatic representation of the finger contacts superimposed thereon. The holes 177 are uniformly spaced parallel to the edges of the tape and may be engaged during the driving of the tape by spike-like elements protruding from the periphery of member 35. The holes, therefore, facilitate the uniform driving of the tape.

A series of perforations are made along the length of the tape where each of the finger contacts 37A—E contacts that tape. These series of perforations corresponding to finger contacts 37A—E respectively are the indicator perforations, stop perforations, tape position control perforations and tape position correction perforations. The tape is displaced five millimeters for ten meters travel of the train thereby requiring that the mechanism for driving the tape described in connection with Figs. 2 and 3 have a driving speed ratio of 1 to 2000. At this speed ratio a tape fifty meters in length is required for each one hundred kilometers of locomotive travel.

The indicator perforations are placed in tape 36 at five meter intervals (corresponding to ten kilometers of locomotive travel) so that the resulting pulses produced when the locomotive is traveling at one hundred kilometers per hour have a repetition frequency equal to those produced by the operation of the clock mechanism 10. The stop perforations and warning perforations are spaced at predetermined intervals to perform the functions described in connection with Fig. 1. The position control perforations are spaced along the tape at five meter intervals and the position correction perforations are spaced at three millimeter intervals. If the relays 64, 66, and 65, 67 cause the tape position correction to be made in one millimeter units approximately one hundred of these position correction perforations are provided on either side of the position control perforation.

Fig. 9 is another top view of a portion of tape 36 showing the relative placement of the various perforations therein. Thus, the perforations in the top row, A, cooperate with finger contact 37A (Fig. 1) to indicate the relation of the train to its schedule as explained in connection with Fig. 1. The perforations in the second row, B, cooperate with finger contact 37B (Fig. 1) to indicate scheduled stopping time as previously explained. The perforations in the third row, C, cooperate with finger contact 37C (Fig. 1) to warn the train operator of a landmark, as previously explained. The perforations in the fourth row, D cooperate with finger contact 37D (Fig. 1) to indicate the correct or incorrect positioning of the tape 36 relative to the actual position of the train as previously explained. The perforations in the fifth row, E, cooperate with finger contact 37E (Fig. 1) to correct the position of the tape, as previously explained.

The tape is prepared for operation before the making of the scheduled journey for which it is prepared and is then properly inserted in the apparatus in the place of the used tape in it.

While there has been here described preferred embodiments of this invention it is understood that various changes and modifications may be made therein without departing from the inventive concept of this invention or the scope of the appended claims.

What is claimed as new and desired to be secured by Letters Patent of the United States, is:

1. Apparatus of the character described including an indicator sensitive to the difference in the repetition frequency of two separate series of electrical pulses, means for producing a first series of pulses of constant repetition frequency and for conveying said pulses to said indicator, means for producing a second series of pulses having a repetition frequency proportional to the speed of a train and for conveying these pulses to said indicator, means for adjusting the repetition frequency of the second said series of pulses and means under control of said last-named means to correct the indication of said indicator whereby the indication due to the variations in the repetition frequency of said second series of pulses is compensated for.

2. Apparatus for indicating the relative speed of a locomotive relative to the scheduled speed comprising means for generating a first series of pulses of constant repetition frequency, means for generating a second series of pulses having a repetition frequency proportional to the speed of the locomotive, and means for indicating the time displacement between the pulses of the first and second series, said means for generating the second series of pulses including a tape having perforations corresponding to predetermined distance along the scheduled route, means for generating a pulse for each perforation, mechanical means controlled by motion of the locomotive for driving said tape, and means for correcting the position of said tape with regard to the distance travelled by the said locomotive along said route comprising means for advancing and for reversing the direction of motion of said tape, electrical means for actuating the last mentioned means including a series of pieces of iron placed at predetermined intervals along said route, a magnet mounted on said locomotive in spaced relation to said pieces of iron, an amplifier connected to said magnet, means for comparing the output of said amplifier with the output of said generating means and means for coupling said comparing means to said advancing and reversing means.

3. Apparatus for indicating the speed of a locomotive relative to the scheduled speed comprising means for generating a first series of pulses of constant repetition frequency, means for generating a second series of pulses having a repetition frequency proportional to the speed of a locomotive, and means for indicating the time displacement between the pulses of the first and second series, said means for generating the second series of pulses comprising a tape having perforations corresponding to pre-determined distances along the scheduled route, means for generating a pulse for each perforation, means controlled by motion of the locomotive for driving said tape and means for correcting the position of the tape with respect to the actual position of the locomotive comprising means for altering the motion of said tape, means for generating pulses dependent upon the actual position of said locomotive, means for comparing said last-mentioned pulses with said perforation generated pulses and means for controlling said motion altering means by said comparing means.

4. Train control system for indicating the speed of a train along a pre-determined route relative to the scheduled speed of said train comprising on said train means for generating pulses spaced by pre-determined intervals of time, means for producing pulses indicative of the distance travelled by said train comprising a tape having two series of perforations spaced at pre-determined points along said tape, means controlled by motion of said train for driving said tape and means for generating a pulse for each of said perforations, in said first series an indicator coupled to said pulse producing and pulse generating means, for indicating the relative time displacement between said pulses having pre-determined time intervals and said pulses generated from said perforations and means for interrupting the coupling between said means for generating pulses having pre-determined time intervals and said indicator comprising means controlled by the other series of perforations in said tape for interrupting said coupling and means for restoring said coupling after a pre-determined interval of time.

5. Train control system according to claim 4 wherein said tape also comprises third and fourth series of perforations and further comprising means for receiving electrical signals at predetermined positions along said route, means controlled by said third series of perforations for generating position signals, means controlled by said fourth series of perforations for generating correction signals, means for advancing and retarding said tape, said advancing and retarding means being controlled by said correction signals and said correcting signals causing the tape to advance when a signal is received by said signal receiving means prior to the generation of a signal by said third series of perforations and causing said tape to retard when a signal is generated by said third series of perforations prior to the receipt of said signal by said signal receiving means, and means coupled to said receiving means and to said means controlled by said third series of perforations for routing said correction signals.

6. Train control system according to claim 5 further comprising means for reducing the reading of said indicator when said retarding means is operated.

7. Train control system according to claim 6 wherein said signal receiving means comprises a magnetic circuit and an amplifier responsive to changes in said magnetic circuit, and further comprising means located at pre-determined positions along said route for altering said magnetic circuit.

HANS HUGO DURHEIM.
STANISLAS VAN MIERLO.

REFERENCES CITED

The following references are of record in the file of this patent:

UNITED STATES PATENTS

| Number | Name | Date |
|---|---|---|
| 328,592 | Lord | Oct. 20, 1885 |
| 466,214 | Behr | Dec. 29, 1891 |
| 591,162 | Fiske | Oct. 5, 1897 |
| 923,511 | Greenbaum | June 1, 1909 |
| 1,001,091 | Thomassin | Aug. 22, 1911 |
| 1,304,565 | Henderson | May 27, 1919 |
| 1,554,028 | Price | Sept. 15, 1925 |
| 1,641,693 | Price et al. | Sept. 6, 1927 |
| 1,973,363 | Wood | Sept. 11, 1934 |
| 2,064,559 | Norrman | Dec. 15, 1936 |
| 2,082,634 | McJohnstone | June 1, 1937 |
| 2,302,081 | Weitman | Nov. 17, 1942 |
| 2,341,678 | Wickes | Feb. 15, 1944 |
| 2,406,574 | Waller et al. | Aug. 27, 1946 |